US010435323B2

(12) United States Patent
Dejneka et al.

(10) Patent No.: US 10,435,323 B2
(45) Date of Patent: Oct. 8, 2019

(54) METHOD OF MAKING GLASS SHEETS WITH GAS PRETREATMENT OF REFRACTORY

(71) Applicant: Corning Incorporated, Corning, NY (US)

(72) Inventors: Matthew John Dejneka, Corning, NY (US); Benjamin Zain Hanson, Big Flats, NY (US); Thomas Dale Ketcham, Horseheads, NY (US); James Robert Rustad, Germantown, MD (US); Susan Lee Schiefelbein, Ithaca, NY (US); Kochuparambil Deenamma Vargheese, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 186 days.

(21) Appl. No.: 15/111,658

(22) PCT Filed: Jan. 12, 2015

(86) PCT No.: PCT/US2015/010951
§ 371 (c)(1),
(2) Date: Jul. 14, 2016

(87) PCT Pub. No.: WO2015/108795
PCT Pub. Date: Jul. 23, 2015

(65) Prior Publication Data
US 2016/0340222 A1    Nov. 24, 2016

Related U.S. Application Data

(60) Provisional application No. 61/927,651, filed on Jan. 15, 2014.

(51) Int. Cl.
*C03B 17/06* (2006.01)
*C04B 35/113* (2006.01)
(Continued)

(52) U.S. Cl.
CPC ............ *C03B 17/064* (2013.01); *C04B 35/10* (2013.01); *C04B 35/113* (2013.01);
(Continued)

(58) Field of Classification Search
None
See application file for complete search history.

(56) References Cited

U.S. PATENT DOCUMENTS 2,919,209 A    1/1955    Bossard
3,245,830 A    4/1966    Flexon et al.
(Continued)

FOREIGN PATENT DOCUMENTS

DE    687997 C    2/1940
FR    2850891 A1    8/2004
(Continued)

OTHER PUBLICATIONS

H.D.Schreiber, et al, "Compositional Dependence of Redox Equilibria in Sodium Silicate Glasses," Journal of Non-Crystalline Solids, 177, pp. 340-346, 1994.
(Continued)

*Primary Examiner* — Cynthia Szewczyk (57) ABSTRACT

A method of making a glass sheet includes exposing a refractory block material comprising at least one multivalent component to a reducing atmosphere for a time and at a temperature sufficient to substantially reduce the at least one multivalent component of the refractory block material. The method also includes flowing molten glass over the refractory block material that has been exposed to the reducing
(Continued)

atmosphere while preventing substantial re-oxidation of the at least one multivalent component.

16 Claims, 3 Drawing Sheets

(51) Int. Cl.
*C04B 35/185* (2006.01)
*C04B 35/443* (2006.01)
*C04B 35/48* (2006.01)
*C04B 35/66* (2006.01)
*C04B 35/10* (2006.01)
*C04B 41/00* (2006.01)
*C04B 41/50* (2006.01)
*C04B 41/85* (2006.01)

(52) U.S. Cl.
CPC .......... *C04B 35/185* (2013.01); *C04B 35/443* (2013.01); *C04B 35/48* (2013.01); *C04B 35/481* (2013.01); *C04B 35/66* (2013.01); *C04B 41/0072* (2013.01); *C04B 41/5072* (2013.01); *C04B 41/85* (2013.01); *C04B 2235/656* (2013.01); *C04B 2235/6567* (2013.01); *C04B 2235/6582* (2013.01); *C04B 2235/6584* (2013.01); *C04B 2235/6587* (2013.01); *C04B 2235/664* (2013.01); *C04B 2235/85* (2013.01)

(56) References Cited

U.S. PATENT DOCUMENTS

| | | | |
|---|---|---|---|
| 3,451,798 A | 6/1969 | Simon | |
| 3,537,834 A | 11/1970 | Simon | |
| 6,974,786 B2 | 12/2005 | Helfinstine et al. | |
| 7,032,412 B2 | 4/2006 | Dorfeld et al. | |
| 7,238,635 B2 | 7/2007 | Ames et al. | |
| 7,409,839 B2 | 8/2008 | Boratav et al. | |
| 8,028,544 B2 | 10/2011 | McIntosh | |
| 8,263,514 B2 | 9/2012 | Citti et al. | |
| 2005/0127549 A1 | 6/2005 | Bischoff et al. | |
| 2005/0130830 A1 | 6/2005 | Ames et al. | |
| 2008/0196449 A1* | 8/2008 | Addiego | C03B 17/064 65/17.3 |
| 2009/0131241 A1* | 5/2009 | Godard | C03B 17/064 501/106 |
| 2010/0028665 A1 | 2/2010 | Lu | |
| 2010/0212359 A1 | 8/2010 | Godard et al. | |
| 2012/0263929 A1* | 10/2012 | Citti | C03B 17/064 428/212 |
| 2014/0230490 A1 | 8/2014 | Ellison et al. | |

FOREIGN PATENT DOCUMENTS

| | | |
|---|---|---|
| JP | 62052168 A | 3/1987 |
| JP | 06183832 A | 7/1994 |
| JP | 09286678 A | 11/1997 |
| JP | 10059728 A | 3/1998 |
| JP | 2001213663 A | 8/2001 |
| JP | 2004516214 A | 6/2004 |
| JP | 2005008454 A | 1/2005 |
| JP | 2010120845 A | 6/2010 |
| WO | 1999023050 A1 | 5/1999 |
| WO | 2010099278 A2 | 9/2010 |
| WO | 2012062913 A1 | 5/2012 |
| WO | 2013106609 A1 | 7/2013 |
| WO | 2015108802 A1 | 7/2015 |

OTHER PUBLICATIONS

M.P.Dickenson and P.C.Hess, "The Structural Role and Homogeneous Redox Equilibria of Iron in Peraluminous, Metalumiouns, and Peralkaline Silicate Melts," Contrib. Mineral. Petrol., 92, pp. 207-217, 1986.
F.G.K.Baucke and G.Roth, "Electrochemical Mechanism of the Oxygen Bubble Formation at the Interface Between Oxidic Melts and Zirconium Silicate Refractories," Glastech. Ber., vol. 61, No. 5, pp. 109-118, 1988.
International Search Report and Written Opinion PCT/US2015/010951 dated Apr. 16, 2015.
International Search Report and Written Opinion PCT/US2015/010963 dated Apr. 16, 2015.
J.F.Stebbins, P.F.McMillan, and D.B.Dingwell, "Structure, Dynamics, and Properties of Silicate Melts," Reviews in Mineralogy, vol. 32, Mineralogical Society of America, 1995.
English Translation of JP2016546475 Office Action dated Sep. 26, 2018; 4 Pages; Japanese Patent Office.
English Translation of CN201580014217.0 Third Office Action dated Jan. 2, 2019, China Patent Office.

* cited by examiner

METHOD OF MAKING GLASS SHEETS WITH GAS PRETREATMENT OF REFRACTORY

CROSS-REFERENCE TO RELATED APPLICATIONS

This application claims the benefit of priority under 35 U.S.C. § 365 of International Patent Application Serial No. PCT/US15/10951 filed on Jan. 12, 2015 designating the United States of America which claims the benefit of priority to U.S. Provisional Application Ser. No. 61/927,651 filed on Jan. 15, 2014, the contents of which are relied upon and incorporated herein by reference in their entirety.

BACKGROUND

Field

The present specification generally relates to methods of glass manufacture and, more specifically, relates to methods of making refractory materials used in glass-forming processes using gas pretreatment.

Technical Background

In the manufacture of glass materials, such as glass sheets used in touch screen and other display applications, the glass materials may be formed into specific shapes using a variety of processes. One method for the manufacture of glass sheets involves fusion drawing molten glass over the sides of a forming device (or isopipe). This can enable the production of thin flat sheets having superior flatness and smoothness compared to glass sheets manufactured by other methods.

In the manufacture of glass sheets using the fusion process, a specially shaped refractory block can be used as the forming device (or isopipe). An exemplary refractory block material comprises predominantly zircon ($ZrSiO_4$) that has been pressed and sintered according to predetermined specifications applicable for the specific forming process at hand.

In certain forming processes involving alkali-containing glasses, contact between the molten glass and new zircon-containing isopipe can result in the formation of undesirable oxygen blisters near the glass-refractory interface. One solution to this problem is to add antimony oxide to the glass material to absorb the oxygen and mitigate blister formation. However, demand is increasing for glasses containing antimony below the levels required for sufficient oxygen blister mitigation.

Accordingly, alternative methods are needed for mitigation of oxygen blister formation.

SUMMARY

According to one embodiment, a method of making a glass sheet includes exposing a refractory block material that includes at least one multivalent component to a reducing atmosphere for a time and at a temperature sufficient to substantially reduce the at least one multivalent component of the refractory block material. The method also includes flowing molten glass over the refractory block material that has been exposed to the reducing atmosphere while preventing substantial re-oxidation of the at least one multivalent component.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments for use in the manufacture of glass sheets and glass manufacturing processes incorporating the same. Whenever possible, the same reference numerals will be used throughout the drawings to refer to the same or like parts.

As used herein, the term "glass sheet" refers to a rigid or flexible glass material having a length, width, and thickness, wherein the thickness can be, for example, less than 1 centimeter, such as less than 5 millimeters, and further such as less than 1 millimeter, and yet further such as less than 500 microns, and still yet further such as less than 300 microns, and even still yet further such as less than 100 microns, such as from 50 microns to 1 centimeter, and further such as from 100 microns to 1 millimeter.

As used herein, the term "reducing atmosphere" refers to an atmosphere or gaseous mixture that has a lower partial pressure of oxygen than air. For example, the reducing atmosphere can comprise less than 20% oxygen on a molar basis, such as less than 15% oxygen, and further such as less than 10% oxygen, including less than 5% oxygen, and further including less than 2% oxygen, and still further including less than 1% oxygen, and still yet further including less than 5,000 ppm of oxygen, such as less than 1,000 ppm of oxygen, including less than 500 ppm of oxygen, and further including less than 200 ppm of oxygen, and yet further including less than 100 ppm of oxygen, and still yet further including less than 50 ppm of oxygen, and even still yet further such as less than 20 ppm of oxygen, such as from 1 ppm to 20% oxygen, including from 10 ppm to 10% oxygen, and further including from 20 ppm to 5% oxygen, and yet further including from 50 ppm to 1% oxygen, and still yet further including from 100 ppm to 1,000 ppm oxygen. Examples of reducing atmospheres can also include those essentially free of oxygen. In addition, reducing atmospheres can include those having pressures lower than atmospheric pressure, such as a complete or partial vacuum.

As used herein, the term "to substantially reduce at least one multivalent component of the refractory block material" refers to changing the redox ratio of an multivalent component such that the amount of the multivalent component in a more reduced state relative to that component in a more oxidized state is increased, such as at least twice the amount present prior to exposure to the reducing atmosphere. For example, if the multivalent component comprises a metal oxide having a 3+ metal ion in the more oxidized state (e.g., $Fe_2O_3$) and a 2+ metal ion in the more reduced state (e.g., FeO), substantially reducing the metal oxide would result in the 2+ metal ion component/3+ metal ion component ratio (e.g., $XFeO/XFe_2O_3$) being at least twice what that ratio was prior to exposure to the reducing atmosphere, such as at least 3 times what that ratio was prior to exposure to the reducing atmosphere, such as at least 5 times what that ratio was prior to exposure to the reducing atmosphere, such as at least 10 times what that ratio was prior to exposure to the reducing atmosphere, such as at least 20 times what that ratio was prior to exposure to the reducing atmosphere, including from 2 to 1,000 times what that ratio was prior to exposure to the reducing atmosphere, such as from 5 to 500 times what that ratio was prior to exposure to the reducing atmosphere, further such as from 10 to 100 times what that ratio was prior to exposure to the reducing atmosphere, and yet further such as from 20 to 50 times what that ratio was prior to exposure to the reducing atmosphere.

As used herein, the term "preventing substantial re-oxidation of the at least one multivalent component" refers to preventing the re-oxidation of at least one multivalent component such that the amount of the multivalent component in a more oxidized state (relative to that component in a more reduced state) is prevented from reaching the amount present prior to exposure to the reducing atmosphere. For example, if the multivalent component comprises a metal oxide having a 3+ metal ion in the more oxidized state (e.g., $Fe_2O_3$) and a 2+ metal ion in the more reduced state (e.g., FeO), preventing substantial re-oxidation of the at least one multivalent component would prevent the metal oxide having the 3+ metal ion (e.g., $Fe_2O_3$) from reaching its amount present prior to exposure to the reducing atmosphere, such as from reaching no greater than 50% of its amount prior to exposure to the reducing atmosphere, including reaching no greater than 20% of its amount prior to exposure to the reducing atmosphere, further including reaching no greater than 10% of its amount prior to exposure to the reducing atmosphere, and yet further including reaching no greater than 5% of its amount prior to exposure to the reducing atmosphere, such as from 1% to 50% of its amount prior to exposure to the reducing atmosphere, including from 2% to 20% of its amount prior to exposure to the reducing atmosphere, and further including from 5% to 10% of its amount prior to exposure to the reducing atmosphere.

As used herein, the term "grain boundary phase" refers to a material that is contained or dispersed within the refractory block material. The grain boundary phase can, for example, comprise at least 1 wt %, such as at least 2 wt %, and further such as at least 5 wt %, and yet further such as at least 10 wt %, including from 1 wt % to 20 wt %, and from 2 wt % to 10 wt % of the total weight of the refractory block material that comprises the grain boundary phase.

Figure 1:
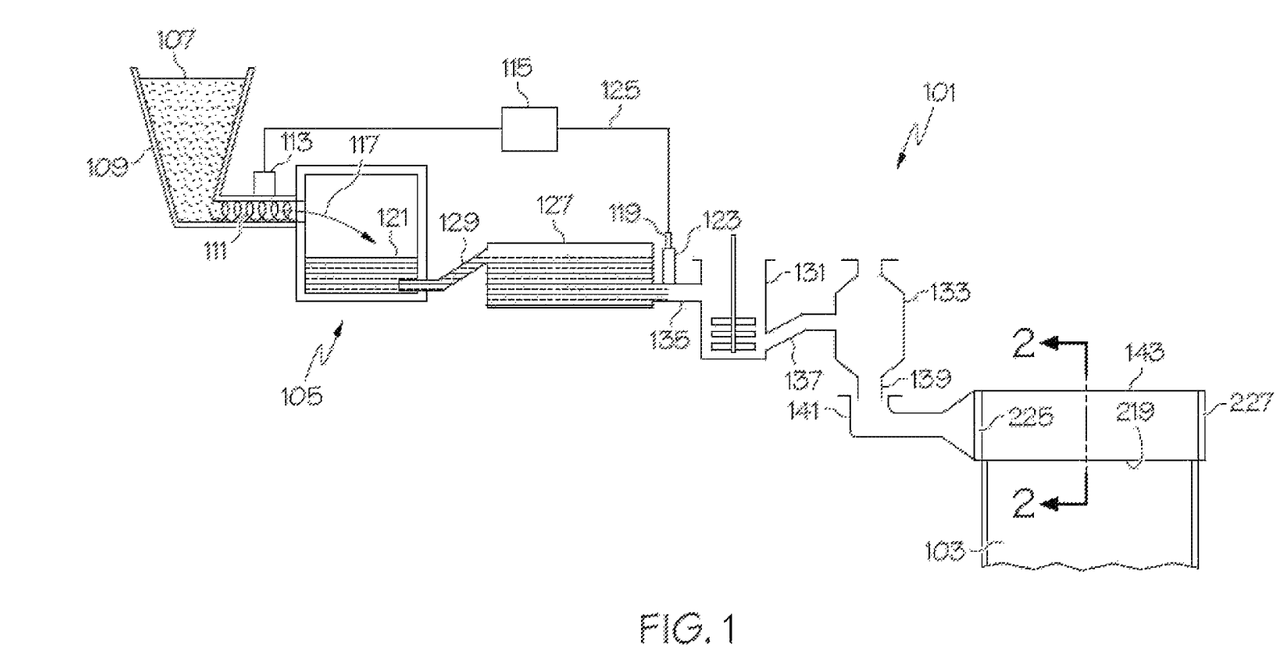
FIG. 1 is a schematic view of a glass forming apparatus including a forming device in accordance with aspects of the disclosure.

FIG. 1 illustrates a schematic view of a glass forming apparatus 101 for fusion drawing a glass ribbon 103 for subsequent processing into glass sheets. The illustrated glass forming apparatus comprises a fusion draw apparatus although other fusion forming apparatus may be provided in further examples. The glass forming apparatus 101 can include a melting vessel (or melting furnace) 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by an arrow 117. A glass level probe 119 can be used to measure a glass melt (or molten glass) 121 level within a standpipe 123 and communicate the measured information to the controller 115 by way of a communication line 125.

The glass forming apparatus 101 can also include a fining vessel 127, such as a fining tube, located downstream from the melting vessel 105 and fluidly coupled to the melting vessel 105 by way of a first connecting tube 129. A mixing vessel 131, such as a stir chamber, can also be located downstream from the fining vessel 127 and a delivery vessel 133, such as a bowl, may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver glass melt 121 from the delivery vessel 133 to an inlet 141 of a forming device 143. As shown, the melting vessel 105, fining vessel 127, mixing vessel 131, delivery vessel 133, and forming device 143 are examples of glass melt stations that may be located in series along the glass forming apparatus 101.

The melting vessel 105 is typically made from a refractory material, such as refractory (e.g. ceramic) brick. The glass forming apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming device 143 is made from a ceramic material, such as the refractory, and is designed to form the glass ribbon 103.

Figure 2:
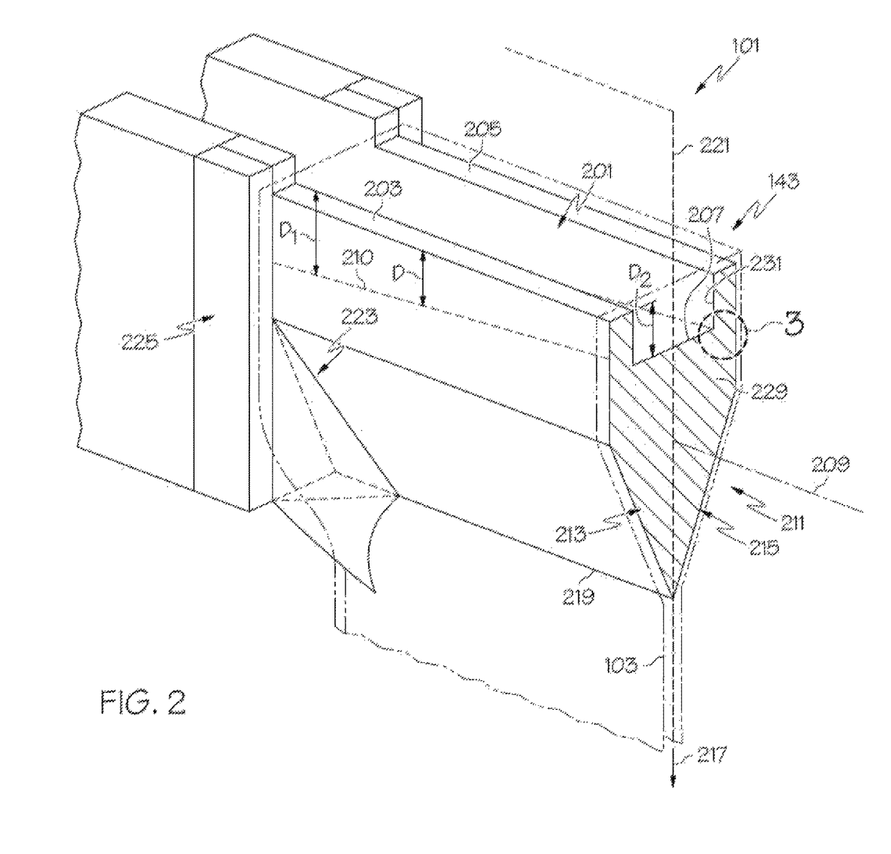
FIG. 2 is a cross-sectional enlarged perspective view of the forming device of FIG. 1.

FIG. 2 is a cross-sectional perspective view of the glass forming apparatus 101 along line 2-2 of FIG. 1. As shown, the forming device 143 can include a trough 201 at least partially defined by a pair of weirs comprising a first weir 203 and a second weir 205 defining opposite sides of the trough 201. As further shown, the trough may also be at least partially defined by a bottom wall 207. As shown, the inner surfaces of the weirs 203, 205 and the bottom wall 207 define a substantially U shape that may be provided with round corners. In further examples, the U shape may have surfaces substantially 90° relative to one another. In still further examples, the trough may have a bottom surface defined by an intersection of the inner surfaces of the weirs 203, 205. For example, the trough may have a V-shaped profile. Although not shown, the trough can include further configurations in additional examples.

As shown, the trough 201 can have a depth "D" between a top of the weir and a lower portion of the trough 201 that varies along an axis 209 although the depth may be substantially the same along the axis 209. Varying the depth "D" of the trough 201 may facilitate consistency in glass ribbon thickness across the width of the glass ribbon 103. In just one example, as shown in FIG. 2, the depth "$D_1$" near the inlet of the forming device 143 can be greater than the depth "$D_2$" of the trough 201 at a location downstream from the inlet of the trough 201. As demonstrated by the dashed line 210, the bottom wall 207 may extend at an acute angle relative to the axis 209 to provide a substantially continuous reduction in depth along a length of the forming device 143 from the inlet end to the opposite end.

The forming device 143 further includes a forming wedge 211 comprising a pair of downwardly inclined forming surface portions 213, 215 extending between opposed ends of the forming wedge 211. The pair of downwardly inclined forming surface portions 213, 215 converge along a downstream direction 217 to form a root 219. A draw plane 221 extends through the root 219 wherein the glass ribbon 103 may be drawn in the downstream direction 217 along the draw plane 221. As shown, the draw plane 221 can bisect the root 219 although the draw plane 221 may extend at other orientations with respect to the root 219.

The forming device 143 may optionally be provided with one or more edge directors 223 intersecting with at least one of the pair of downwardly inclined forming surface portions 213, 215. In further examples, the one or more edge directors can intersect with both downwardly inclined forming surface portions 213, 215. In further examples, an edge director can be positioned at each of the opposed ends of the forming wedge 211 wherein an edge of the glass ribbon 103 is formed by molten glass flowing off the edge director. For instance, as shown in FIG. 2, the edge director 223 can be positioned at a first opposed end 225 and a second identical edge director (not shown in FIG. 2) can be positioned at a second opposed end (see 227 in FIG. 1). Each edge director 223 can be configured to intersect with both of the downwardly inclined forming surface portions 213, 215. Each edge director 223 can be substantially identical to one another although the edge directors may have different characteristics in further examples. Various forming wedge and edge director configurations may be used in accordance with aspects of the present disclosure. For example, aspects of the present disclosure may be used with forming wedges and edge director configurations disclosed in U.S. Pat. Nos. 3,451,798, 3,537,834, 7,409,839 and/or U.S. Provisional Pat. Application No. 61/155,669, filed Feb. 26, 2009 that are each herein incorporated by reference in its entirety.

Figure 3:
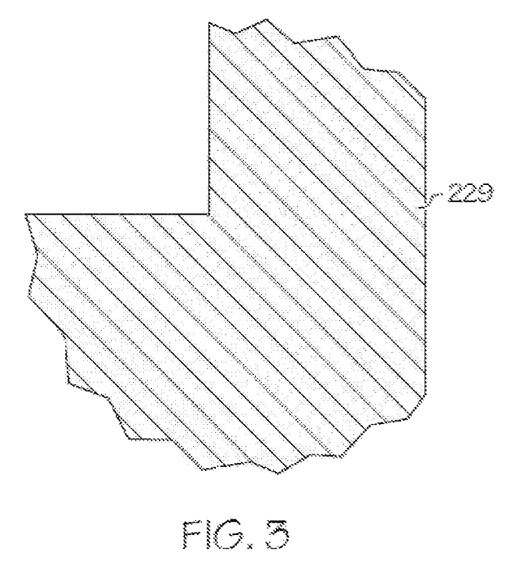
FIG. 3 is an enlarged view of the forming device of FIG. 2 according to one embodiment of the disclosure.
Figure 4:
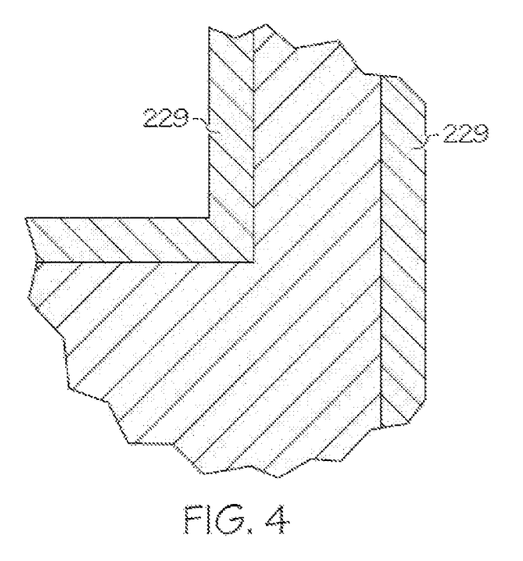
FIG. 4 is an enlarged view of the forming device of FIG. 2 according to another embodiment of the disclosure.

FIG. 3 is an exaggerated sectional perspective view of 3 of the forming device 143 of FIG. 2. As illustrated, the entire body of the forming device 143 can comprise the refractory 229. In another instance illustrated in FIG. 4, the forming device 143 can comprise the refractory 229 that is formed as an outer layer on the exterior of the forming device 143 such that the molten glass contacts only the refractory. For instance, the refractory 229 with a predetermined thickness can be formed on the outer side of the forming device 143.

The refractory material can, in certain exemplary embodiments, comprise a wide range of ceramic compositions that have material properties that are suitable for fusion drawing molten glass into a glass ribbon. Typical material characteristics of the refractory material in the forming device can comprise resistance to high temperatures without contaminating the molten glass, strength, the ability to avoid creep, resistance to wear and/or other features. For example, the refractory block material may comprise at least one component material selected from the group consisting of zircon, alumina, titania, mullite, monazite, xenotime, spinel, zirconia, beta-alumina, and beta double prime-alumina.

In a particularly preferred embodiment, the refractory block material comprises zircon ($ZrSiO_4$). For example, the refractory block material may comprise at least 50% zircon by weight, such as at least 75% zircon by weight, including at least 80% zircon by weight, further including at least 95% zircon by weight, such as at least 98% zircon by weight, including at least 99% zircon by weight. For example, the refractory block material may consist essentially of zircon. The refractory block material may comprise minor components, such as 0.2% to 0.4% titania ($TiO_2$) by weight, as disclosed in U.S. Pat. No. 6,974,786, the entire disclosure of which is incorporated herein by reference. Minor components can also include at least one of the combination of $ZrO_2$, $TiO_2$, and $Fe_2O_3$, as disclosed in U.S. Pat. No. 7,238,635, the entire disclosure of which is incorporated herein by reference.

The refractory block material may also comprise at least one grain boundary phase that can result from at least one grain boundary phase precursor material being added to the refractory material prior to the refractory material being pressed (e.g., isopressed) and then fired into a forming device. Subsequent to firing, a refractory block material that comprises at least one grain boundary phase may be porous or nonporous, and when porous, may comprise open and/or closed pores. For example, in at least one embodiment, the refractory block material may be regarded as a generally porous material wherein the grain boundary phase forms a relatively thin glassy layer on at least a portion of the surface of the pores.

During firing, the grain boundary phase may change such that the grain boundary phase comprises components that were not initially present in the grain boundary phase as the result of, for example, assimilation of tramp components during firing. For example, a grain boundary phase that primarily comprises $SiO_2$, $Na_2O$, and $ZrO_2$, prior to firing may, subsequent to firing, additionally comprise other components, such as $Al_2O_3$, $TiO_2$, $Fe_2O_3$, CaO, $K_2O$, and MgO. These assimilated components can, upon contact with certain molten glass compositions result in the undesirable formation of oxygen blisters near the glass-refractory interface.

For example, when molten glass flows over the surface of a forming device comprising a refractory block material that comprises open pores and at least one grain boundary phase, the molten glass can infiltrate the pores of the refractory and interact with the grain boundary phase that is present on at least a portion of the surface of the pores. Depending on the composition of the grain boundary phase and the composition of the molten glass, this can result in the facilitation of reactions that result in oxygen formation that can, in turn, result in blistering.

For example, when certain alkali-containing molten glasses mix with certain grain boundary phases wherein iron oxides are present, the following (reversible) redox reaction can liberate oxygen:

$$Fe_2O_3 \leftrightarrow 2FeO + 0.5O_2$$

Examples of alkali-containing molten glasses include glasses comprising $Na_2O$, including glasses comprising in weight percent on an oxide basis: (i) 50≤$SiO_2$≤65%; (ii) 10≤$Al_2O_3$≤20%; (iii) 0≤MgO≤5%; (iv) 10≤$Na_2O$≤20%; (iv) 0≤$K_2O$≤5%; and (v) ≥0 and ≤1% of at least one of $B_2O_3$, CaO, $ZrO_2$ and $Fe_2O_3$. Alkali-containing glasses, can for example, include alkali aluminosilicate glasses, such as Gorilla® Glass available from Corning Incorporated.

Whether the above reaction is driven to the left or the right is dependent on factors such as temperature, redox ratio of iron oxide (XFeO/X$Fe_2O_3$), other system constituents that modify the reactive environment (e.g., cause a buffering effect, etc.), and whether the system constituents exist in an oxidizing or reducing environment.

Accordingly, embodiments disclosed herein include a step of first exposing a refractory block material comprising at least one multivalent component to a reducing atmosphere for a time and at a temperature sufficient to substantially reduce the at least one multivalent component of the refractory block material. Then, a step of flowing molten glass over the refractory block material that has been exposed to the reducing atmosphere while preventing substantial re-oxidation of the at least one multivalent component.

In certain exemplary embodiments, the at least one multivalent component comprises iron oxide.

The step of exposing the refractory block material to the reducing atmosphere can, for example, be carried out by exposing the refractory block material to the reducing atmosphere as the refractory block material is heated from ambient room temperature to operating temperature and continuing to expose the refractory block material to the reducing atmosphere while flowing molten glass over the refractory block material for at least a time sufficient to coat the refractory block material with molten glass.

For example, in embodiments where ambient room temperature is from 20-40° C. and operating temperature is from 600-1500° C., the refractory block material can be exposed to the reducing atmosphere over the entire time that the temperature surrounding the refractory block material is between room temperature and operating temperature, including temperatures of at least 500° C., such as from 500° C. to 1500° C., such as from 600° C. to 1400° C. This time can, for example, be at least 10 hours, such as at least 20 hours, and further such as at least 30 hours, and yet further such as at least 40 hours, and still yet further such as at least 50 hours, such as from 10 hours to 400 hours, including from 20 hours to 200 hours and further including from 20 hours to 100 hours.

The step of exposing the refractory block material to the reducing atmosphere can continue as molten glass is flowed over the refractory block material for a time sufficient to coat the refractory block material with molten glass. While not limited to any specific amount of time, this time can, for example, be at least 5 hours, such as at least 10 hours, and further such as at least 20 hours, and yet further such as at least 50 hours, such as from 5 hours to 200 hours, including from 10 hours to 100 hours.

The step of exposing the refractory block material to the reducing atmosphere can also, for example, include a step of applying a coating material over the refractory block material after the refractory block material has been exposed to the reducing atmosphere for a time and at a temperature sufficient to substantially reduce at least one multivalent component of the refractory block material. For example, a coating material can be applied over the refractory block material (e.g., as a solution, suspension, powder, or slurry) before, during, and/or after exposing the refractory block material to the reducing atmosphere for a time and at a temperature sufficient to substantially reduce at least one multivalent component of the refractory block material.

For example, a coating can be applied at ambient room temperature (e.g., 20-40° C.), followed by exposing the refractory block material to the reducing atmosphere at an intermediate temperature, such as a temperature of at least 500° C., including a temperature ranging from 500° C. to 1500° C., including from 600° C. to 1400° C., followed by raising the temperature to that sufficient to encapsulate or fuse the coating material over the refractory block material to form a relatively gas-tight seal on the outside of the refractory block material, such as a temperature of at least 1000° C., including from 1000° C. to 2000° C. In such embodiments, the exposure time of the refractory block material to the reducing atmosphere can, for example, be at least 10 hours, such as at least 20 hours, and further such as at least 30 hours, and yet further such as at least 40 hours, and still yet further such as at least 50 hours, such as from 10 hours to 400 hours, including from 20 hours to 200 hours and further including from 20 hours to 100 hours.

The coating material should preferably have a coefficient of thermal expansion (CTE) that is in relatively close conformance with the CTE of the refractory block material and does not adversely interact with the molten glass. In certain preferred embodiments the coating material can be a glassy material. Examples of glassy coating materials include alkaline earth boro-aluminosilicate glasses, such as glasses that include in weight percent on an oxide basis: (i) $65 \leq SiO_2 \leq 75\%$; (ii) $7 \leq Al_2O_3 \leq 13\%$; $5 \leq B_2O_3 \leq 15\%$; (iv) $5 \leq CaO \leq 15\%$; (v) $0 \leq BaO \leq 5\%$; (vi) $0 \leq MgO \leq 3\%$; and (vii) $0 \leq SrO \leq 5\%$. Alkaline earth boro-aluminosilicate glasses can also include those that are essentially free of BaO. An example of an alkaline earth boro-aluminosilicate glass that can be used as a coating material in certain embodiments is Eagle XG® Glass available from Corning Incorporated.

In any of the above embodiments, the reducing atmosphere can, for example, comprise at least 95% nitrogen on a molar basis, such as at least 98% nitrogen on a molar basis, including at least 99% nitrogen on a molar basis, including consisting essentially of nitrogen. The reducing atmosphere can also include other essentially inert gasses such as at least 1% on a molar basis, such as at least 2% on a molar basis, and further such as at least 3% on a molar basis, such as from 1% to 5%, and further such as from 1% to 10% on a molar basis at least one gas selected from the group consisting of helium, neon, argon, krypton, and xenon.

The reducing atmosphere can also, for example, comprise less than 2% oxygen on a molar basis, such as less than 1% oxygen on a molar basis, and further such as less than 1000 ppm of oxygen on a molar basis, and further such as less than 100 ppm of oxygen on a molar basis, and yet further such as less than 50 ppm of oxygen on a molar basis, including an atmosphere that is essentially free of oxygen.

The reducing atmosphere may also comprise at least 1% on a molar basis, such as at least 2% on a molar basis, and further such as at least 3% on a molar basis, such as from 1% to 5% on a molar basis, at least one component selected from the group consisting of hydrogen and carbon monoxide. For example, in certain exemplary embodiments, the reducing atmosphere comprises about 97% nitrogen on a molar basis and about 3% hydrogen on a molar basis. Addition of hydrogen into the reducing atmosphere can, in certain embodiments, lower the exposure temperature of the reducing atmosphere by at least 200° C., such as at least 300° C., and further such as at least 400° C., and yet further such as at least 500° C., and still yet further such as at least 600° C. from what it would otherwise be without hydrogen inclusion, including lowering an exposure temperature from about 1200° C. to about 600° C.

The reducing atmosphere may also be present in combination with at least one getter material selected from the group consisting of carbon (e.g., graphite), magnesium, aluminium, barium, zirconium, and titanium.

Embodiments disclosed herein will be further illustrated in view of the following examples.

Three 1 inch by 1 inch by ¼ inch refractory block material samples were each tested in three different reducing atmospheres in order to determine the effectiveness of the reducing atmosphere in mitigating blisters on the surface of a molten glass composition contacting the refractory block materials. The samples are set forth in Table 1 and the reducing atmospheres are set forth in Table 2.

TABLE 1

Refractory Samples

| Sample No. | Description |
|---|---|
| 1 | Isopressed refractory material comprising greater than 95 wt % zircon and less than 10 vol % porosity |
| 2 | Isopressed refractory material comprising greater than 90 wt % alumina, less than 10 wt % mullite, and less than 5 vol % porosity |
| 3 | Isopressed refractory material comprising greater than 95 wt % zircon, less than 5 wt % cristobalite, and less than 10 vol % porosity |

TABLE 2

Reducing Atmospheres

| Atmosphere Type | Description |
|---|---|
| A | 0.01% $O_2$ in $N_2$ (100 ppm $O_2$) |
| B | 0.1% $O_2$ in $N_2$ (1,000 ppm $O_2$) |
| C | 1% $O_2$ in $N_2$ (10,000 ppm $O_2$) |

Step 1: Gas Pre-Treatment

For each experimental run, a refractory block material sample was first loaded into a testing furnace at room temperature. Next, a reducing atmosphere was flowed over the sample for a period of about one hour in order to purge the ambient atmosphere from the furnace. Following this step, the furnace was heated to about 1,200° C. and then held at that temperature for about four hours while continuing to flow the reducing atmosphere over the sample. Next, the furnace was cooled to room temperature and the flow of the reducing atmosphere was discontinued. The samples were then removed from the furnace.

Step 2: Plaque Test

A sheet of Gorilla® glass available from Corning Incorporated was placed on top of each sample subjected to the gas-pretreatment process and the sample and glass were loaded into the testing furnace at room temperature. Next, a reducing atmosphere was flowed over the sample for a period of about one hour in order to purge the ambient atmosphere from the furnace. Following this step, the furnace was heated to about 1,200° C. and then held at that temperature for about one hour while continuing to flow the reducing atmosphere over the sample. Next, the furnace was cooled to room temperature and the flow of the reducing atmosphere was discontinued. The samples were then removed from the furnace and the interface between the glass and the sample was visually inspected for blisters. The experimental results are set forth in Table 3.

TABLE 3

Blistering Results for Refractory Samples in Reducing Atmospheres

| Sample No. | Atmosphere Type | Result |
|---|---|---|
| 1 | A | No noticeable blisters |
| 1 | B | Low blistering |
| 1 | C | Moderate blistering |
| 1 | No reducing atmosphere pretreatment | High blistering |
| 2 | A | No noticeable blisters |
| 2 | B | Low blistering |
| 2 | C | High blistering |
| 3 | A | No noticeable blisters |
| 3 | B | No noticeable blisters |
| 3 | C | Low bistering |

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of making a glass sheet comprising:
   exposing a refractory block material comprising iron oxide to a reducing atmosphere for a time and at a temperature sufficient to substantially reduce the iron oxide of the refractory block material; and
   flowing molten glass over the refractory block material that has been exposed to the reducing atmosphere while preventing substantial re-oxidation of the iron oxide.

2. The method of claim 1, wherein the refractory block material comprises at least one component material selected from the group consisting of zircon, alumina, titania, mullite, monazite, xenotime, spinel, zirconia, beta-alumina, and beta double prime-alumina.

3. The method of claim 1, wherein the refractory block material comprises zircon.

4. The method of claim 1, wherein the refractory block material comprises at least one grain boundary phase.

5. The method of claim 1, where the reducing atmosphere comprises at least 95% nitrogen on a molar basis.

6. The method of claim 1, wherein the reducing atmosphere comprises less than 2% oxygen on a molar basis.

7. The method of claim 1, wherein the reducing atmosphere comprises at least 1% on a molar basis of at least one component selected from the group consisting of hydrogen and carbon monoxide.

8. The method of claim 1, wherein the reducing atmosphere comprises at least 1% on a molar basis of at least one component selected from the group consisting of helium, neon, argon, krypton, and xenon.

9. The method of claim 1, wherein the reducing atmosphere is present in combination with at least one getter material selected from the group consisting of carbon, magnesium, aluminium, barium, zirconium, and titanium.

10. The method of claim 1, wherein the refractory block material is exposed to the reducing atmosphere for a period of at least 10 hours.

11. The method of claim 1, wherein the refractory block material is exposed to the reducing atmosphere at a temperature of at least 500° C.

12. The method of claim 1, wherein the refractory block material is exposed to the reducing atmosphere as the refractory block material is heated from ambient temperature to operating temperature and continues to be exposed to the reducing atmosphere during the step of flowing molten glass over the refractory block material for at least a time sufficient to coat the refractory block material with molten glass.

13. The method of claim 1, wherein the method further comprises applying a coating material over the refractory block material after the refractory block material has been exposed to the reducing atmosphere for a time and at a temperature sufficient to substantially reduce the iron oxide of the refractory block material.

14. The method of claim 13, wherein the coating material comprises glass.

15. The method of claim 13, wherein the method further comprises raising the temperature above a temperature at which the coating is applied in order to encapsulate the refractory block material with the coating material.

16. The method of claim 1, wherein the molten glass comprises an alkali oxide.

* * * * *

UNITED STATES PATENT AND TRADEMARK OFFICE
CERTIFICATE OF CORRECTION

| | |
|---|---|
| PATENT NO. | : 10,435,323 B2 |
| APPLICATION NO. | : 15/111658 |
| DATED | : October 8, 2019 |
| INVENTOR(S) | : Matthew John Dejneka et al. |

Page 1 of 1

It is certified that error appears in the above-identified patent and that said Letters Patent is hereby corrected as shown below:

On the Title Page

On page 2, in Column 2, item (56), Other Publications, Line 2, delete "Metalumiouns," and insert -- Metaluminous, --, therefor.

Signed and Sealed this
Twenty-first Day of January, 2020

Andrei Iancu
*Director of the United States Patent and Trademark Office*